Aug. 16, 1932.                    L. F. MEUNIER                    1,871,720
                        ATTACHMENT FOR DRIVING SPINDLES
                              Filed July 22, 1927
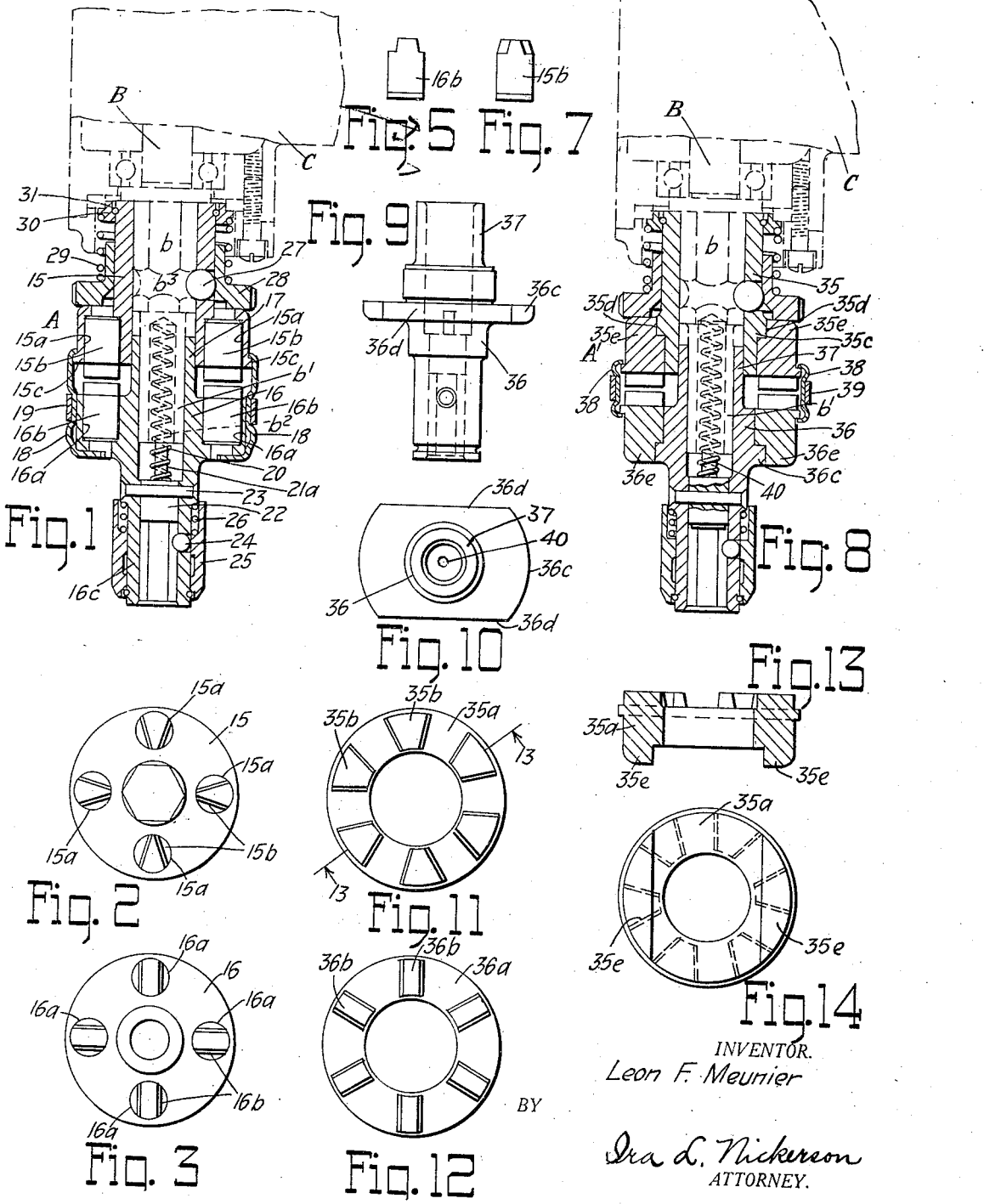
INVENTOR.
Leon F. Meunier
BY
Ira L. Nickerson
ATTORNEY.

Patented Aug. 16, 1932

1,871,720

UNITED STATES PATENT OFFICE

LEON F. MEUNIER, OF CLEVELAND, OHIO, ASSIGNOR TO CHICAGO PNEUMATIC TOOL COMPANY, OF NEW YORK, N. Y., A CORPORATION OF NEW JERSEY

ATTACHMENT FOR DRIVING SPINDLES

Application filed July 22, 1927. Serial No. 207,656.

This invention relates to power machines and apparatus for use therewith. It has particular reference to attachments for rotary spindles, especially those which incorporate clutch mechanism. More specifically it concerns attachments embodying some type of clutch mechanism and intended for certain operations which include nut running, stud setting, screw driving etc. Attachments of the last mentioned type are commonly used on portable or hand-supported power driven tools in assembly operations.

One object of the invention is to provide an attachment of the described type which can be easily applied as a unit to the driving means and as easily removed therefrom. Another object is to permit convenient renewal or replacement of the clutch members as they become worn or broken. Another object is to provide a simple, compact and strong attachment which will withstand hard usage, but will be relatively inexpensive to manufacture and assemble as well as to keep in service. Other objects will be apparent from the detailed description which follows.

In order to illustrate the invention concrete embodiments thereof are shown in the accompanying drawing in which:

Fig. 1 is a vertical sectional view of an attachment secured to the forward end of a machine having a rotary spindle;

Figs. 2 and 3 are plan views of the clutch faces of the driving and driven elements of the attachment shown in Fig. 1;

Figs. 4 and 5 are respectively a top plan and side end elevational views of the renewable clutch teeth elements shown in Fig. 3;

Figs. 6 and 7 are respectively plan and side elevational views of the renewable clutch teeth elements shown in Fig. 2;

Fig. 8 is a vertical sectional view similar to Fig. 1 showing a modified form of attachment;

Figs. 9 and 10 are side elevational and bottom plan views respectively of the driven sleeve element shown in Fig. 8;

Figs. 11 and 12 are plan views of the engaging faces of the clutch members secured to the driving and driven elements respectively of Fig. 8;

Fig. 13 is a transverse sectional view on the line 13—13 of Fig. 1; and

Fig. 14 is a bottom plan view of the clutch member shown in Fig. 11.

The embodiment of the invention shown in Fig. 1 comprises an attachment indicated generally at A arranged to be detachably secured as a unit to a rotary spindle such as B driven from any source of power and mounted in suitable bearings in a casing C which may form part of a stationary machine or may be the casing of a portable power tool. Spindle B projects from casing C as shown and immediately adjacent the casing has a portion of polygonal or other shape adapted to give a driving connection as indicated at $b$. Beyond the polygonal portion the spindle has a reduced cylindrical extension $b'$ having an internal bore $b^2$ for a purpose later to be described.

Attachment A has a driven sleeve 15, the upper portion of whose bore is polygonal or other shape to conform to the shape of portion $b$ of spindle B so that sleeve 15 rotates with the spindle when the attachment is in place as shown. A driven sleeve 16 also forming a part of attachment A, telescopes over the cylindrical portion $b'$ of spindle B and has an annular extension 17 telescoping within the lower end of the bore of driving sleeve 15, which bore is annular for this purpose. Thus, driven sleeve 16 has a bearing both upon spindle B and upon driving sleeve 15 and is freely rotatable relative to the same in the position shown in Fig. 1. The opposing faces of driving and driven members 15 and 16 are provided with interengaging clutch teeth (Figs. 1, 2 and 3) to enable the rotative impulse transmitted to sleeve 15 by spindle B to be in turn transmitted to driven sleeve 16. By preference the clutch teeth are replaceable and the arrangement shown in Figs. 1 to 3 by which the teeth may be conveniently replaced when worn or broken consists in providing a series of bores 15$a$ in driving sleeve 15 in which are seated with a press fit plugs 15$b$ (Figs. 6 and 7) of a shape to fit the bores 15$a$. Sleeve 16 has a similar series of bores 16$a$ in which are seated similar plugs 16$b$ (Figs. 4 and 5) also of a shape to have a press fit with the bores 16a. Plugs 15b and 16b each provide a clutch tooth projecting beyond the surface of their respective members 15 and 16 for cooperating engagement. By preference the plugs 15a have teeth with relatively diverging sides, these sides conforming substantially to radii from the center of the axis of member 15, while the teeth provided by plugs 16a have parallel sides as shown. The sides of the plugs 15a and 16a are inclined or bevelled (Figs. 5 and 7) to cause sleeves 15 and 16 to be forced apart out of clutching engagement when the nut, stud or screw, which is being worked upon, is driven home.

Sleeves 15 and 16 are maintained in telescoping engagement but permitted limited relative movement for engagement and disengagement of their clutch teeth by means of two semicircular metal stampings 18 which engage sleeve 16 and a projecting flange 15c of member 15, the stampings being retained in place by an encircling spring ring 19. Sleeves 15 and 16 are normally held apart to the extent permitted by stampings 18 by a coil spring 20 extending into bore b2 of spindle B and having engagement with a centering pin 21a on a stop block 22 within the bore of sleeve 16, the block being retained in place by a cross pin 23. The lower end of sleeve 16 has an extension 16c to serve as a chuck for the working tool and this extension may be provided with any suitable means for retaining the working tool in place, such as a retractable ball 24 controlled by sleeve 25 backed by a spring 26.

As indicated above, the parts comprising the attachment are held together by stampings 18 and the attachment as a unit is applied to the spindle by telescoping the same thereover. Any suitable means for releasably retaining the attachment on the spindle may be provided, the means disclosed being a retractable ball 27 cooperating with a groove b3 in the polygonal portion of the spindle, the ball being controlled in an obvious manner by the slide 28 on member 15. The slide is normally held in locking position by a coil spring 29 which engages a stop collar 30 held on the end of sleeve 15 by a retainer ring 31.

The modified attachment A' shown in Fig. 8 is releasably secured to spindle B of machine C in the same manner as attachment A and conforms in its essentials thereto. Thus, the attachment includes a driving sleeve 35 having telescoping engagement and keyed connection with the polgonal portion b of the spindle and receives with a telescoping running fit extension 37 of driven sleeve 36 which telescopes over the cylindrical extension b' of the spindle B.

However, instead of carrying individual renewable clutch teeth after the manner disclosed in Fig. 1, sleeves 35 and 37 are arranged to have removably secured thereto clutch members 35a and 36a, each having a plurality of clutch teeth 35b and 36b respectively which are preferably integral with the members. These clutch members have a press and telescoping fit with their respective sleeves and in addition are suitably keyed thereto so as to provide a positive driving connection. For this purpose each sleeve is provided with a projecting annular flange 35c or 36c respectively, each flange being cut away to form opposed flats 35d or 36d, (this particular feature being clearly shown in relation to driven sleeve 36 in Figs. 9 and 10). The clutch members have extended portions 35c and 36e to cooperate with the flats on the flanges (see Figs. 13 and 14 for clutch member 35a). The clutch members 35a and 36a have flanges adjacent their opposed faces which are engaged by two semicircular metal stampings 38, the stampings being held in place by a spring ring 39. As in the instance of Fig. 1, stampings 38 maintain the parts of attachment A' in assembly and permit limited relative movement between the driving and driven sleeves 35 and 36 to permit clutching and declutching of the same. The sleeves are normally maintained out of clutching engagement by a coil spring 40 disposed in a manner in all respects similar to the arrangement shown in Fig. 1. By preference the clutch teeth on clutching member 35a have sides forming parts of radii of a circle having its center at the axis of sleeve 35, while the faces of the clutch teeth on clutch member 36a are in substantial parallelism.

When the attachment is in use, pressure applied to the tool or machine carrying the attachment, or by the work against the attachment, overcomes the pressure of spring 20 or 40 and causes the clutch members of the driving and driven sleeves of the attachment to engage. As the nut, stud or screw is driven home, the beveled sides of the clutch teeth force the sleeves apart into de-clutching position. The angle of the bevel of the clutch teeth determines the amount of pressure necessary to drive a fastening member home, or the extent to which it will be driven with a given pressure.

From the above it will be apparent that assembly work in automobile plants and in other establishments working on quantity production basis will be facilitated through the use of applicant's attachment which is quickly applied to the driving spindle of the tool or machine and is as quickly discarded and replaced by another when the clutch teeth are worn or broken, that the attachment can be readily disassembled and new clutch members inserted thereby making it unnecessary to discard costly parts of the attachment, that the telescoping engagement of both sleeves of the attachment with each other and with the driving spindles makes for rigidity and strength, that the formation of the clutching teeth is such as to facilitate the separation of the same when the fastening member acted upon is driven home, and that the entire attachment is characterized by simplicity, strength and economy both in first cost and in upkeep.

While the invention has been herein disclosed in what is now considered to be preferred forms thereof, it is to be understood that the invention is not limited to the specific details thereof, but covers all changes, modifications and adaptations within the scope of the appended claims.

I claim as my invention:

1. A tool chuck for attachment to a rotatable spindle comprising driving and driven elements arranged for limited movement toward and from each other, renewable clutch members telescopingly engaging said elements with a press fit, and cooperating means integral with said elements and said members providing engaging faces positively keying said members to their respective supporting elements.

2. A tool chuck for attachment to a rotatable spindle comprising driving and driven elements arranged for limited movement toward and from each other, and renewable clutch members telescopingly engaging said elements, said members and said elements having complemental cut-away portions providing engaging shoulders establishing a keyed driving connection for rotation in either direction.

3. A tool chuck for attachment to a rotatable spindle comprising driving and driven elements arranged for limited movement toward and from each other, and renewable clutch members on said elements, said members and said elements having telescoping portions for engagement with a press fit and cooperating flats brought into engagement by the telescoping movement to establish a positive driving action.

4. The combination with a rotatable spindle having a polygonal portion and a cylindrical part extending from said portion, of a tool chuck therefor comprising driving and driven sleeves having cooperating clutch members, both sleeves being in telescoping relation with said spindle, the driving sleeve with said polygonal portion and the driven sleeve with said cylindrical part.

5. The combination with a rotatable spindle having a polygonal portion and a cylindrical part extending from said portion, of a tool chuck therefor comprising driving and driven sleeves, one of said sleeves being in telescoping relation with said polygonal portion and the other sleeve with said cylindrical part of said spindle, said sleeves being also in telescoping relation with each other, and interengageable clutch means on said sleeves.

6. The combination with a rotatable spindle having a polygonal portion and a cylindrical part extending from said portion, of a tool chuck therefor comprising driving and driven sleeves in telescoping relation with said polygonal portion and said cylindrical part of said spindle respectively, said sleeve being also in telescoping relation with each other, means maintaining said sleeves in engagement with each other but permitting relative axial movement, means releasably securing said driving sleeve to said spindle, opposing clutch members on said sleeves, and resilient means interposed between said driven sleeve and said spindle for normally keeping said clutch members out of contact.

7. The combination with a rotatable spindle having a polygonal portion and a cylindrical part extending from said portion, of a tool chuck therefor comprising driving and driven sleeves in telescoping relation with each other, means releasably maintaining said sleeves in engagement but permitting limited relative axial movement thereof, opposed clutch teeth on said sleeves, said chuck being applicable to and removable from said spindle as a unit, said driving sleeve being arranged to fit the polygonal portion of said spindle and having means releasably securing the unit thereto, said driven sleeve being arranged to telescope over the cylindrical portion of said spindle and to be rotatable thereon.

8. The combination with a rotatable spindle having a polygonal portion and a cylindrical part extending from said portion, of a tool chuck therefor comprising driving and driven sleeves in telescoping relation with each other, means releasably maintaining said sleeves in engagement and permitting limited relative axial movement thereof, opposed clutch teeth on said sleeves, said chuck being applicable to and removable from said spindle as a unit, said driving sleeve being arranged to fit the polygonal portion of said spindle and having means releasably securing the unit thereto, said driven sleeve having an axial bore permitting the sleeve to telescope over the cylindrical portion of said spindle and to be rotatable theron, a stop block in said driven sleeve bore, and a spring interposed between said block and the end of said spindle yieldingly to maintain said clutch teeth out of engagement.

9. The combination with a rotatable spindle of a tool chuck having driving and driven elements in telescoping relation with each other, the driving element being arranged for telescoping and keying contact with said spindle, the driven element being arranged for telescoping engagement with said spindle but rotatable relative thereto and to said driving element, and cooperating clutch means on said driving and driven elements.

10. A tool chuck for attachment to a rotatable spindle comprising driving and driven elements having telescoping portions, clutch teeth carried by said elements, and means preventing separation of said elements but permitting relative movement to engage and disengage said teeth, said means comprising members engaging said elements and resilient means engaging said members yieldingly to maintain them in operative relation with said elements.

11. A tool chuck for attachment to a rotatable spindle comprising driving and driven elements having telescoping portions, clutch teeth carried by said elements, and means preventing separation of said elements but permitting relative movement to engage and disengage said teeth, said means comprising stampings of sheet material engaging the exterior of said elements, and a spring clip for holding said stampings in place.

12. In a tool chuck having driving and driven elements for attachment to a rotatable spindle a clutch member for removable attachment to one of said elements comprising an annulus having clutch teeth on one end face thereof, and means on the other end for cooperative keying engagement with its supporting member.

13. In a tool chuck having driving and driven elements for attachment to a rotatable spindle a clutch member for removable attachment to one of said elements comprising an annulus to be telescopingly mounted with a press fit upon its supporting member, one end face having clutch teeth and the other end face being cut away to form a flat for keying engagement with its supporting member.

14. In a tool chuck having driving and driven elements for attachment to a rotatable spindle a clutch member for removable attachment to said elements comprising an annulus to be telescopingly mounted upon its supporting member, one end face having clutch teeth projecting therefrom, a radially projecting flange upon the exterior of said annulus for cooperation with a retainer device, and means on the other end face for keying engagement with its supporting member.

15. In a tool chuck having driving and driven elements for attachment to a rotatable spindle, a clutch member for replaceable engagement with either of said elements comprising an annulus to be telescopingly mounted upon the element, one end face having clutch teeth projecting therefrom and the other end face being partly cut away in a transverse direction to provide thrust shoulders to establish positive keying engagement with the supporting element for rotation in either direction.

Signed by me at Cleveland, in the county of Cuyahoga and State of Ohio this 18th day of July, 1927.

LEON F. MEUNIER.